United States Patent [19]
Reiner

[11] Patent Number: 6,134,275
[45] Date of Patent: Oct. 17, 2000

[54] METHOD FOR TRANSMITTING DATA BETWEEN A TERMINAL AND A PORTABLE DATA CARRIER OVER A WIRELESS ELECTROMAGNETIC TRANSMISSION LINK

[75] Inventor: Robert Reiner, Neubiberg, Germany

[73] Assignee: Siemens Aktiengesellschaft, Munich, Germany

[21] Appl. No.: 09/256,283

[22] Filed: Feb. 23, 1999

Related U.S. Application Data

[63] Continuation of application No. PCT/DE97/01715, Aug. 12, 1997.

[30] Foreign Application Priority Data

Aug. 23, 1996 [DE] Germany ............... 196 34 134

[51] Int. Cl.$^7$ ............... H03C 1/52; H04L 27/04
[52] U.S. Cl. ............... 375/300; 375/353
[58] Field of Search ............... 375/300, 302, 375/354, 353

[56] References Cited

U.S. PATENT DOCUMENTS 3,793,588  2/1974  Gerwen et al. ............... 375/296
4,571,589  2/1986  Slocum et al. .

FOREIGN PATENT DOCUMENTS 0 595 034 A1  5/1994  European Pat. Off. .

OTHER PUBLICATIONS

"Pulse Techniques"(Hölzler et al.), $2^{nd}$ edition, vol. 1, pp. 244–277.

"Infra–Red Data Transmission is Speeding Up" (Lemme), Electronic 3, 1996, pp. 38–44.

"PPM Transmission Over A Photon Counting Channel: Comparison Among Various Transmission Formats" (Cancellieri et al.), vol. 7, No. 4, 1996, pp. 359–376.

Primary Examiner—Don Vo
Assistant Examiner—Phuong Phu
Attorney, Agent, or Firm—Herbert L. Lerner; Laurence A. Greenberg; Werner H. Stemer

[57] ABSTRACT

A method for transmitting data between a terminal and a portable data carrier over a wire-free electromagnetic transmission link using a carrier signal which is 100% ASK-modulated in accordance with the data. The carrier signal serving as a clock signal for the portable the data carrier. The significance of an item of data is determined by a position of a shift keying point in the carrier signal within a time slot. The information content of the shift keying point corresponds to a number of N bits, N being greater than or equal to 2. The significance of the N bits is defined by a position of the shift keying point within $2^N$ possible positions within the time slot. At the start or at the end of a time slot there is a zero time period in which no shift keying point which is assigned to the data to be transmitted occurs, in order to avoid an unacceptably long loss of the carrier signal.

4 Claims, 11 Drawing Sheets

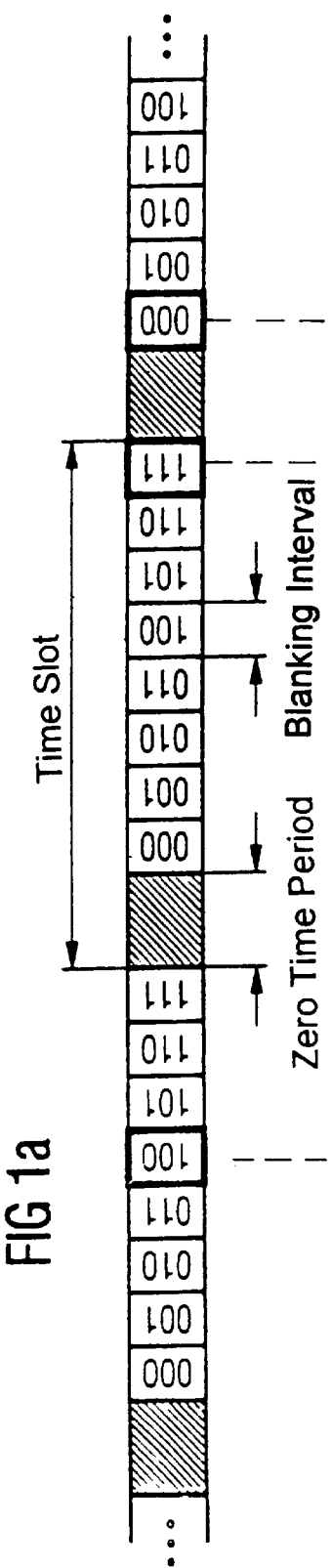
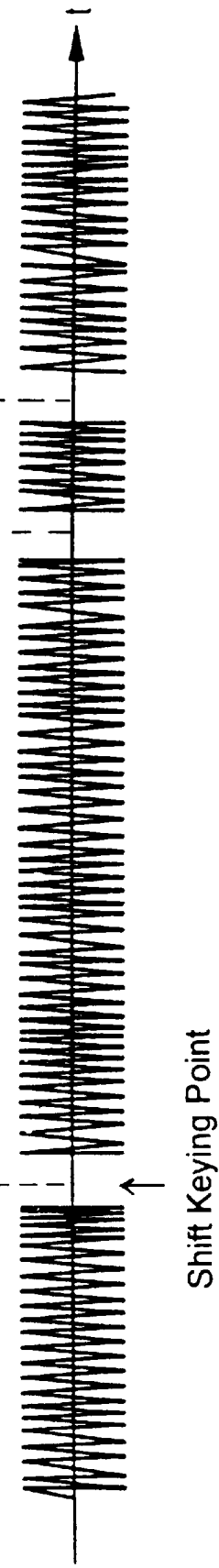
FIG 1a
FIG 1b

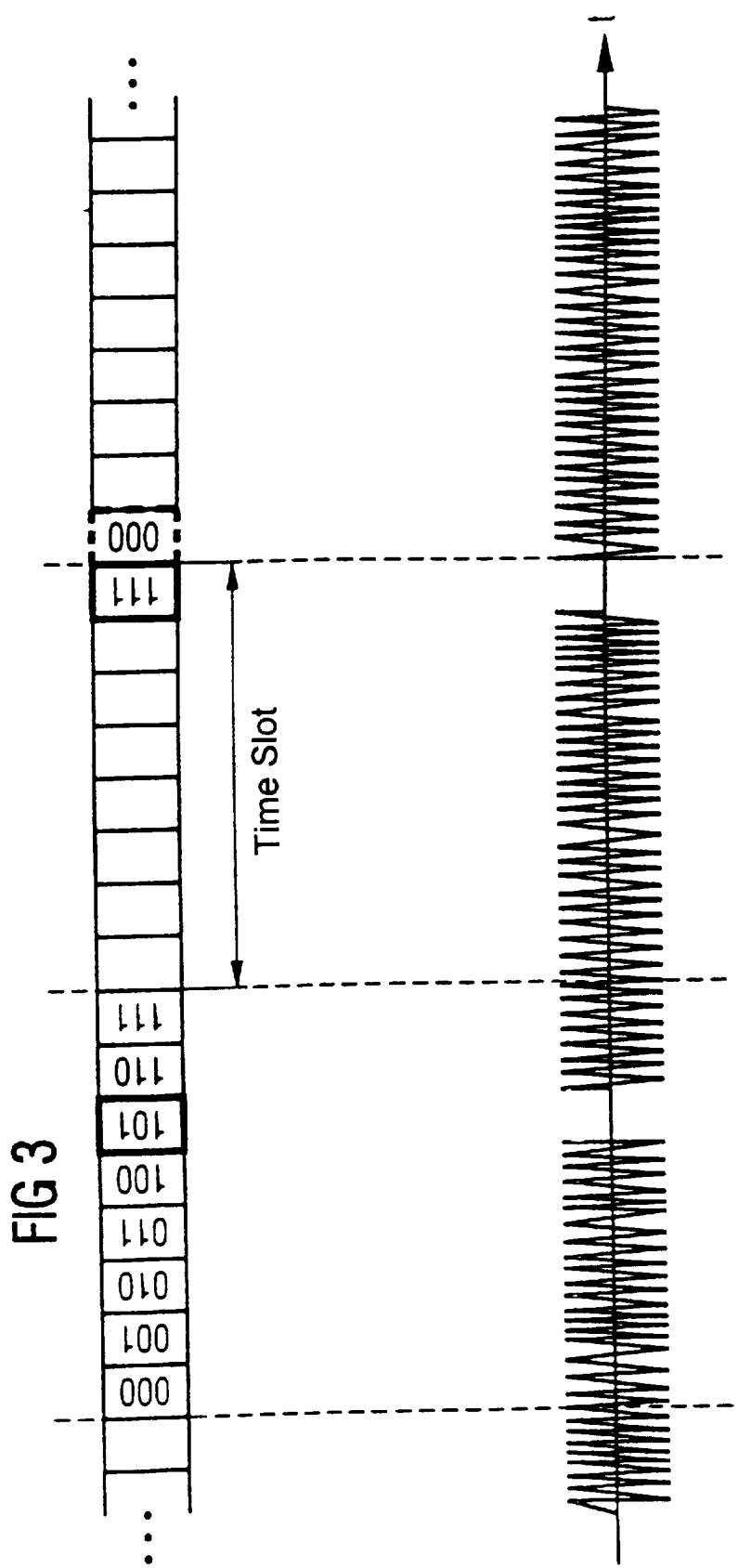

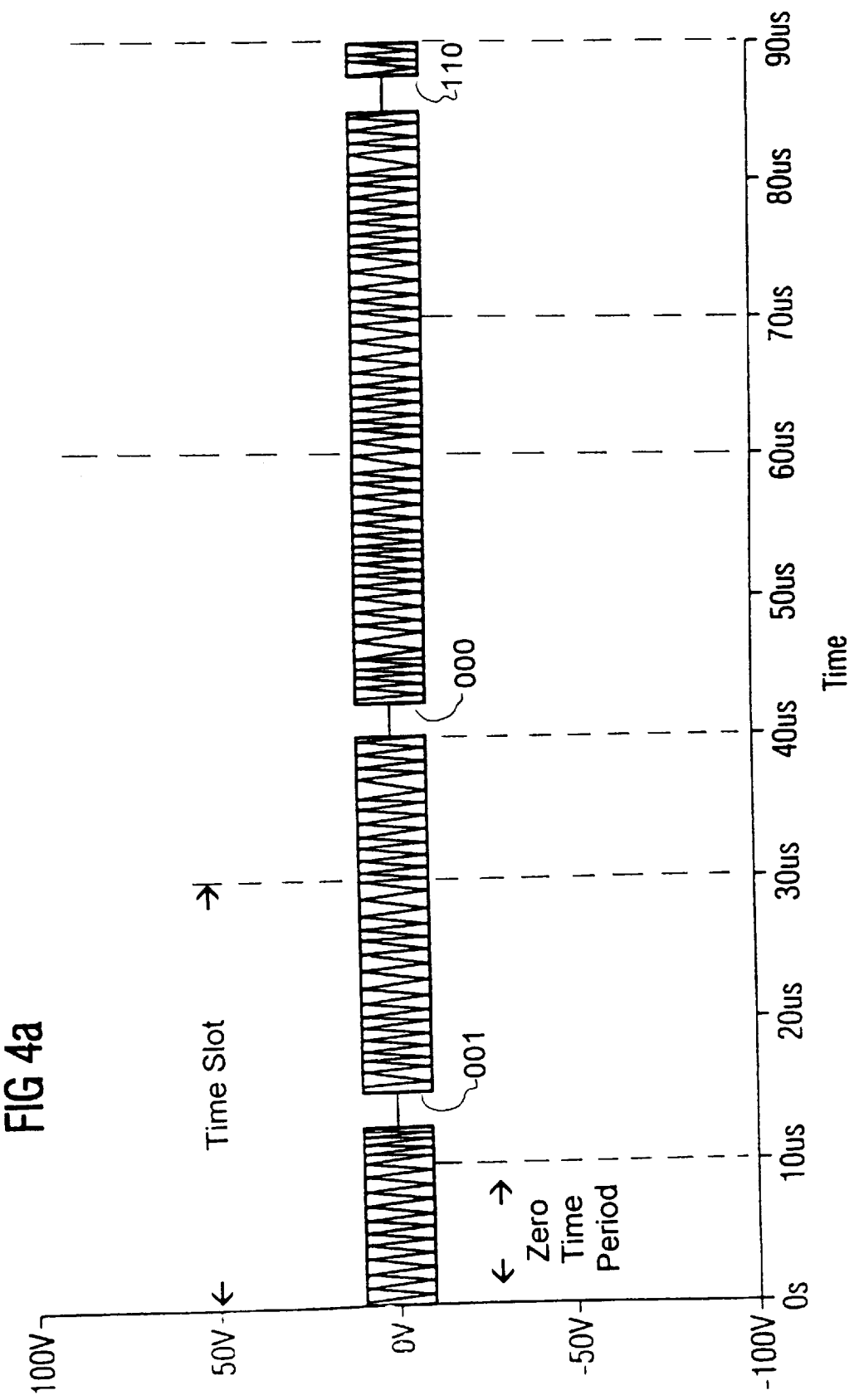

METHOD FOR TRANSMITTING DATA BETWEEN A TERMINAL AND A PORTABLE DATA CARRIER OVER A WIRELESS ELECTROMAGNETIC TRANSMISSION LINK

CROSS-REFERENCE TO RELATED APPLICATION

This is a continuation of copending International Application PCT/DE97/01715, filed Aug 12, 1997, which designated the United States.

BACKGROUND OF THE INVENTION

Field of the Invention

Transmission methods in which portable data carriers exchange information with a terminal in a contactless fashion, i.e. by inductive or capacitive coupling or generally over a wire-free electromagnetic transmission link, are becoming increasingly widespread. Here, the portable data carrier is normally also supplied with power by the terminal in a contactless fashion, for which purpose a high-frequency carrier signal is used on which, in addition, the data are modulated, on the one hand, and which, on the other hand, serves directly as a clock signal in the data carrier.

For the transmission of data, in most applications the carrier signal is merely switched on and off so that a 100% amplitude shift keying (ASK) modulation takes place. The carrier signal is then usually not gated out or switched off or left unchanged during the entire bit time window, defined by an "electrical" bit period and referred to below as a time period, in order to transmit a logic "1" or "0" but rather only during a significantly shorter time. The gating out interval is for example a quarter or a third of the bit time window or time slot in length. As a result, between two states that lead to gating out, the carrier signal is present for long enough to ensure the supply of power and of the clock.

A possible coding is provided by the Miller code. Here, a logic "1" is transmitted by a gating out interval in the center of a time slot. A logic "0" is transmitted via a gating out interval at the start of a time slot, a logic "0" which is transmitted after a logic "1", not being represented by a gating out interval in the time slot, in order to avoid excessively small distances between gating out intervals.

FIG. 6A represents a signal in the Miller code with which the amplitude of a carrier signal is to be modulated. It represents a bit sequence 101000110. The time slots are indicated by vertical dotted lines. A gating out interval has approximately a quarter of the duration of a time slot. FIG. 6B represents the associated frequency spectrum which is determined computationally, the signal from FIG. 6A having been modulated onto a carrier signal with a frequency of 10 MHz. As is clear, an envelope of the side bands with a (sinx/x) shape is produced, it being possible to determine a distance between the maximum amplitude of the side bands and the carrier of approximately 18.2 dB.

When the worst case of a modulation with a sequence of ones 111111111 is assumed, as illustrated in FIG. 7A, a frequency spectrum is obtained such as is illustrated in FIG. 7B. Here the distance between the side bands and the carrier is still just approximately 10.5 dB.

According to the regulations for radio approval and the interim standard ETS 300330 (ETSI, September 1994) on which these are based, an ISM frequency of 13.56 MHz, for example, is provided for the carrier, with a level limit of 42 dB$\mu$A/m @ 10 m. The bandwidth for the carrier is just +/−7 kHz, so that the modulation spectrum with the described modulation and bit coding in accordance with the Miller code is completely outside this. In the aforesaid standard, the level outside is limited with 20 dB$\mu$A/m @ 10 m, that is to say 22 dB under the carrier, the measurement bandwidth being 10 kHz. The described system with 100% ASK modulation with Miller coding exceeds this limit, as stated before, and can obtain radio approval only if modulation is not carried out continuously and the mean value is used, something which is acceptable according to previous, clear regulations, but not according to ETS 300330 and the FCC regulation in the USA, which prescribe a quasi-peak evaluation.

The document "Infrarot-Datenubertragung wird schneller" [Infrared Data Transmission is Becoming Faster] by Helmuth Lemme from Elektronik [Electronics] 3/1996, pages 38 to 44, it is known to use a pulse-position modulation in order to increase the data rate when transmitting in the infrared range, but each pulse is assigned two bits. However, here the pulse-position modulation is used to obtain a higher data rate with the same number of transmitted pulses per time unit, so that the amplitude of the side bands of the frequency spectrum does not change, which is however also not significant in this case. However, since the intention is to aim for the maximum possible pulse rate here, there are no intervals between the pulses so that, given a succession of bit sequences 11 and 00, the carrier signal is gated out over the duration of two pulses. With infrared transmission this does not constitute a further problem since here there is an oscillator for generating the clock in the receiver.

In methods such as those on which the present invention is based, in which the carrier signal acts directly as a clock signal, this would however lead to an unacceptably long loss of the clock signal.

SUMMARY OF THE INVENTION

It is accordingly an object of the invention to provide a method for transmitting data between a terminal and a portable data carrier over a wireless electromagnetic transmission link that overcomes the above-mentioned disadvantages of the prior art methods of this general type, in which a greater distance between the side band amplitudes and the carrier amplitude is obtained with approximately the same bit rate, without gating out for an unacceptably long time the carrier signal which functions as the clock signal.

With the foregoing and other objects in view there is provided, in accordance with the invention, an improved method for transmitting data between a terminal and a portable data carrier via a wire-free electromagnetic transmission link, the improvement which includes: transmitting a carrier signal that is amplitude shift keying (ASK) modulated in accordance with the data and the carrier signal serving as a clock signal for the portable data carrier, a significance of the data is determined by a position of a shift keying point in the carrier signal within a time slot, an information content of the shift keying point corresponding to a number of N bits, where N being greater than or equal to 2, and a significance of the N bits defined by the position of the shift keying point within $2^N$ possible positions within the time slot, and at one of a start and at an end of the time slot there is a zero time period in which no shift keying point occurs in the data to be transmitted.

With the foregoing and other objects in view there is further provided, in accordance with the invention, an improved method for transmitting data between a terminal and a portable data carrier via a wire-free electromagnetic transmission link, the improvement which includes: transmitting a carrier signal that is 100% amplitude shift keying (ASK) modulated in accordance with the data and the carrier signal serving as a clock signal for the portable data carrier, a significance of the data is determined by a position of a shift keying point in the carrier signal within a time slot, the shift keying point corresponding to a number of N bits, N being greater than or equal to 2, and a significance of the N bits defined by the position of the shift keying point within $2^N$ possible positions within the time slot, and if the data has the significance determined by a first possible position in the time slot and occurs after an occurrence of the data having the significance determined by a last possible position in the time slot, the significance of the data having the first possible position is determined by a fact that no shift keying point occurs at any position in the time slot.

In the transmission method according to the invention, at least two bits, preferably three bits, are transmitted per shift keying point in the carrier signal. Here, a shift keying point is a point at which the amplitude of the carrier signal is changed. In the case of a 100% ASK modulation, there would be gating out so that a gating out interval would be present. The significance that these bits have is determined by the position of the shift keying point within a time slot with a defined length and/or duration. With N bits per shift keying point it must therefore be possible to detect $2^N$ possible positions for a shift keying point, that is to say in the case of three bits per shift keying point it must be possible to detect eight possible positions, within the duration of one time slot. Thus, although a relatively great degree of expenditure is required for the detection of the shift keying points in the receiver, when there is a constant bit rate fewer shift keying points per time unit are necessary, so that the pulse rate is lower and thus the amplitude of the side bands of a carrier signal which is modulated with it is lower. Depending on the number of bits selected per shift keying point, it is even possible simultaneously to increase the bit rate and reduce the side band amplitude.

If the bit rate is to remain constant, for example because a predefined transmission protocol is to be complied with, it is advantageous if the time period according to the invention has, within one time slot in which a shift keying point assigned to the data to be transmitted does not occur, referred to below as zero time period, the same duration or an integral multiple thereof as a possible position of a shift keying point. As a result, the detection of the shift keying points is made considerably simpler in comparison with a zero time period of any desired length.

Other features which are considered as characteristic for the invention are set forth in the appended claims.

Although the invention is illustrated and described herein as embodied in a method for transmitting data between a terminal and a portable data carrier over a wireless electromagnetic transmission link, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1A and 1B are diagrammatic schematic representations of time conditions during a method resulting in 100% ASK-modulated carrier signals according to the invention;

FIG. 3 is a schematic representation of the method without a zero time period;

FIGS. 4A and 4B are graphs of a variation over time of a carrier signal which has been modulated with a bit sequence 001000110, and an associated frequency spectrum;

DESCRIPTION OF THE PREFERRED EMBODIMENTS

Figure 2:
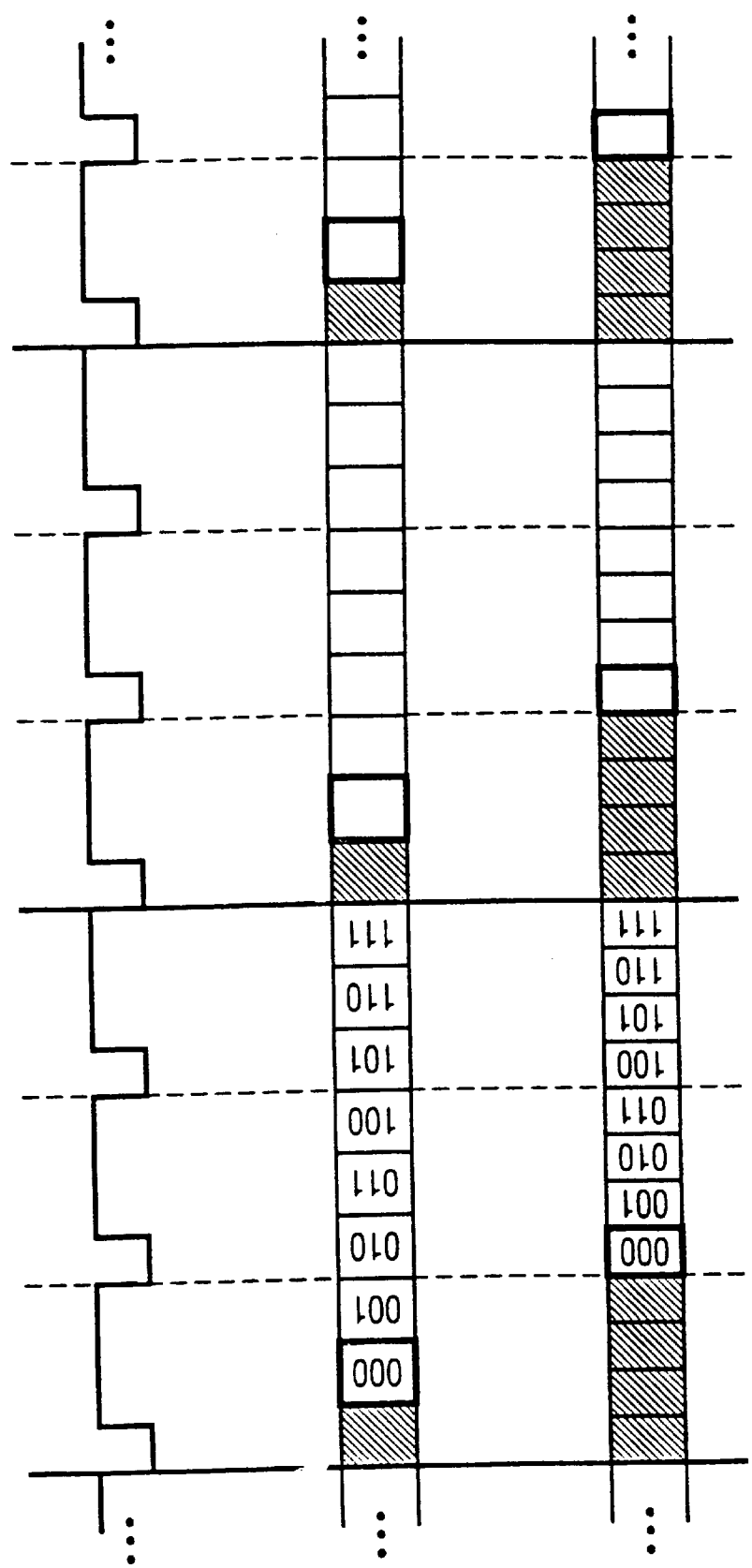
FIG. 2 is a timing diagram showing different possible ways of configuring a time slot.
Figure 4B:
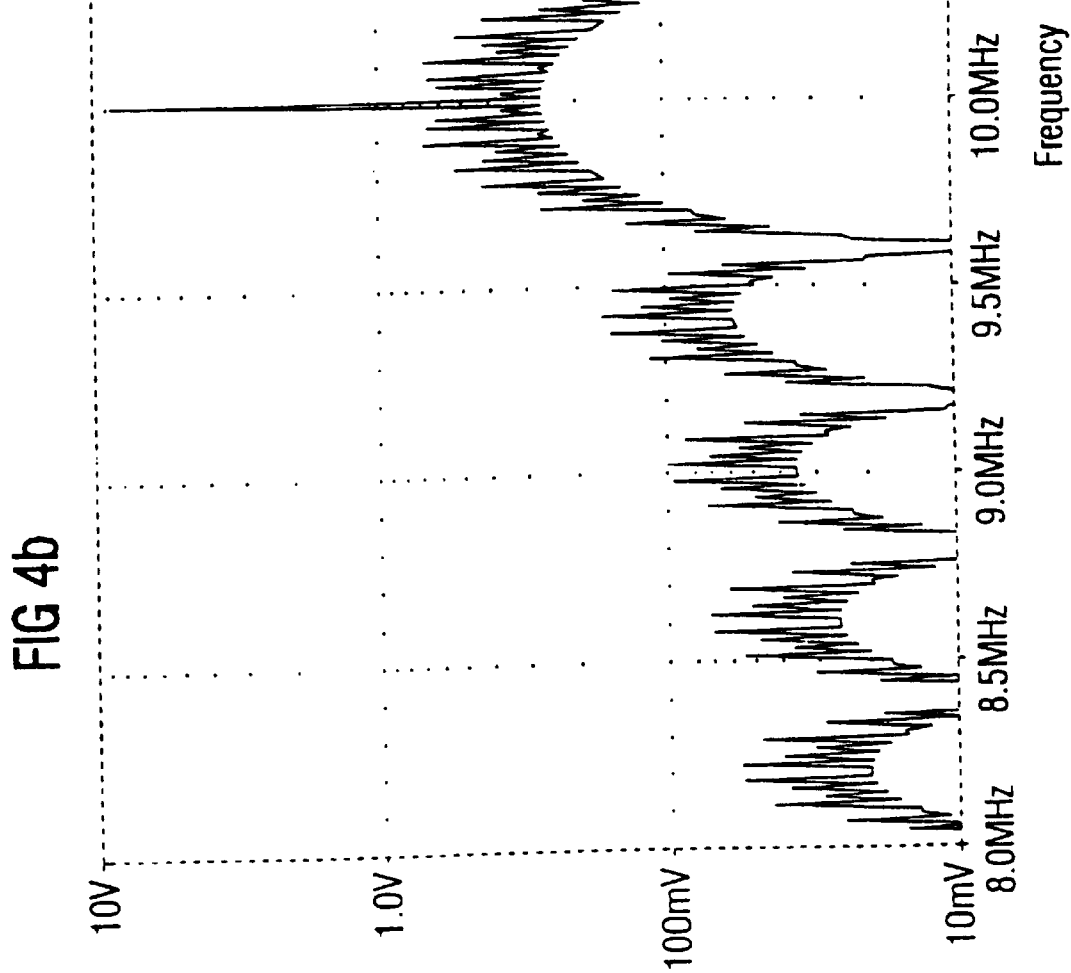
Figure 5A:
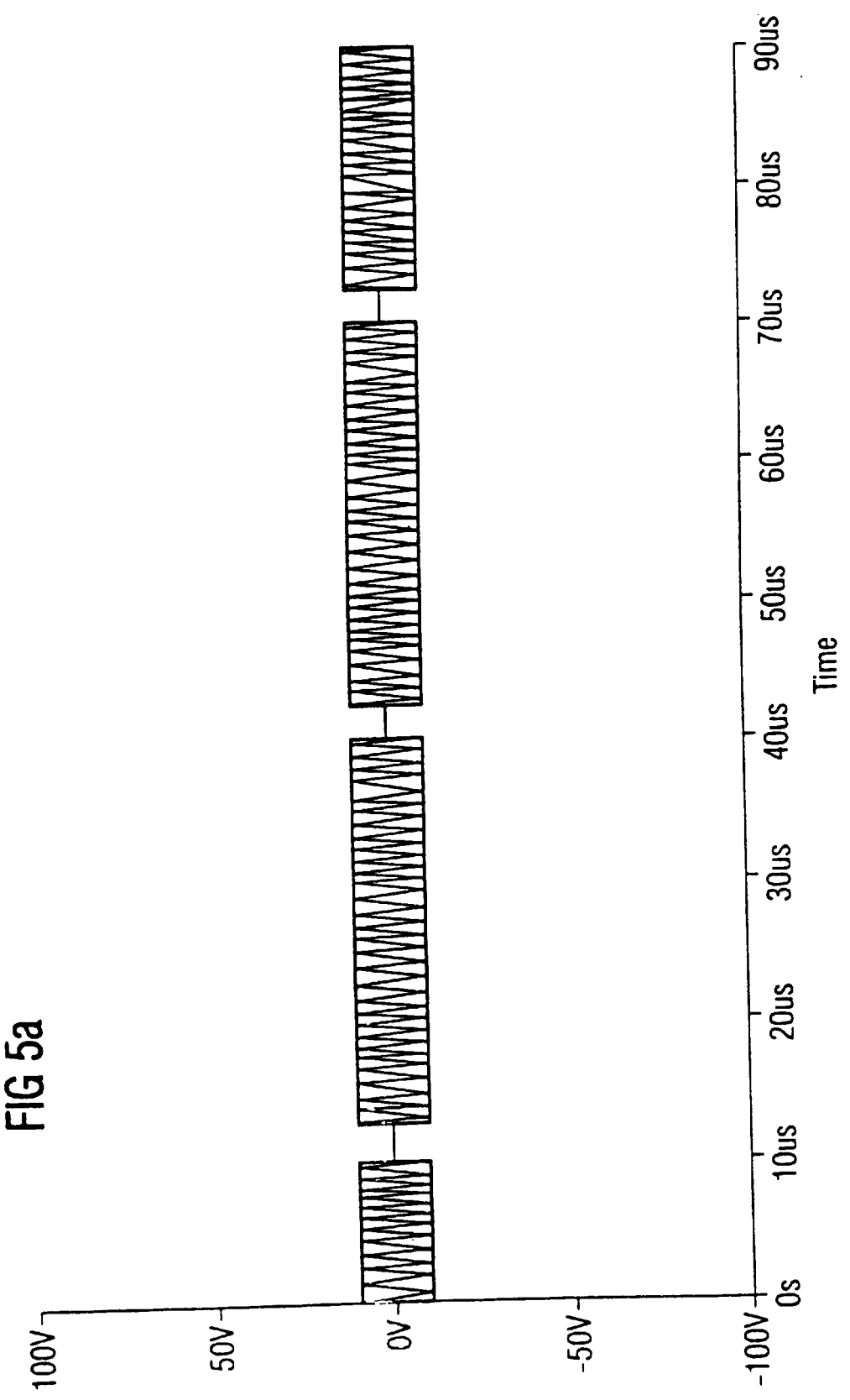
FIGS. 5A and 5B are graphs of the variation over time of the carrier signal which has been modulated with a bit sequence 000000000, and of the associated frequency spectrum.
Figure 5B:
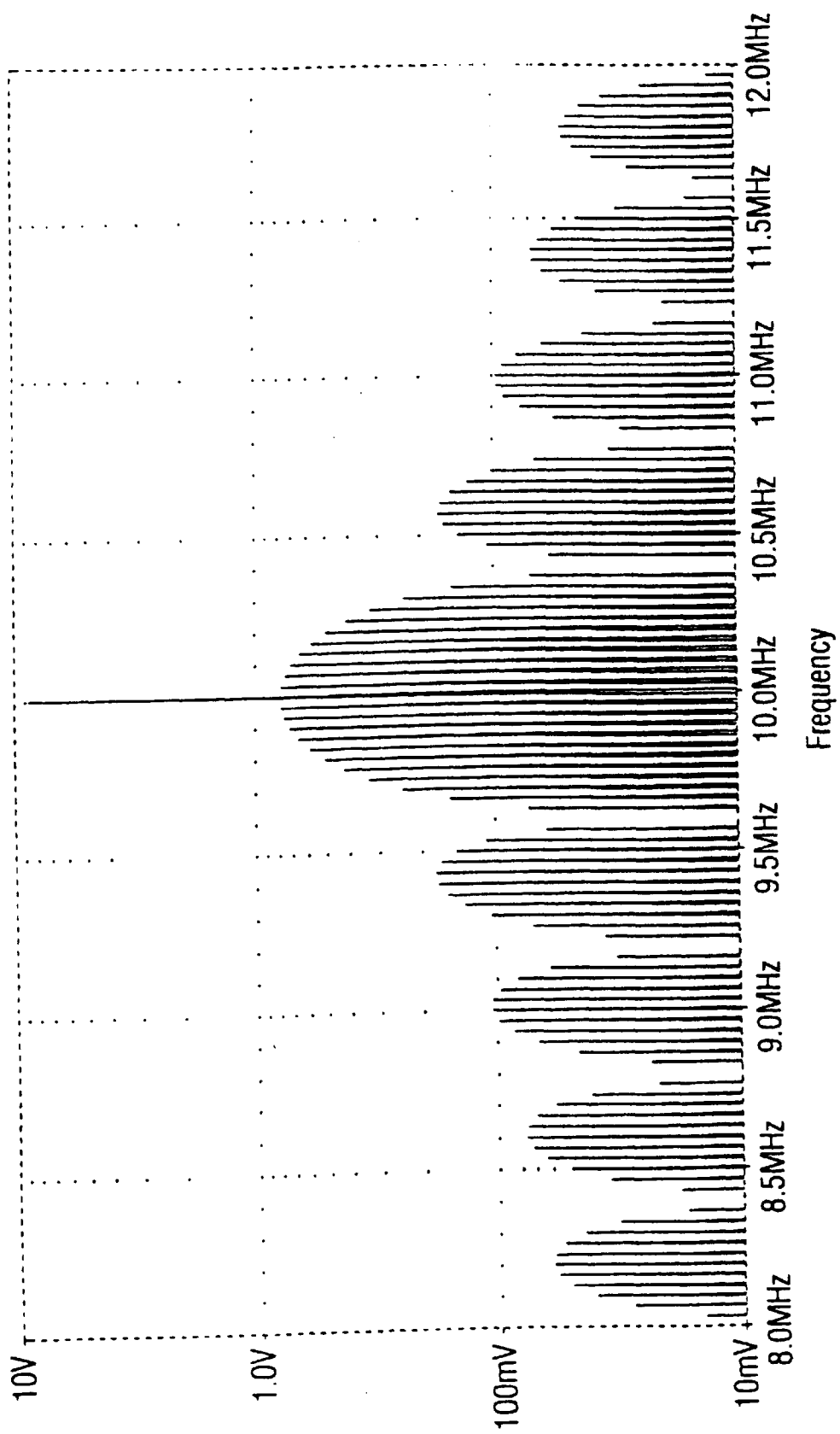
Figure 6A:
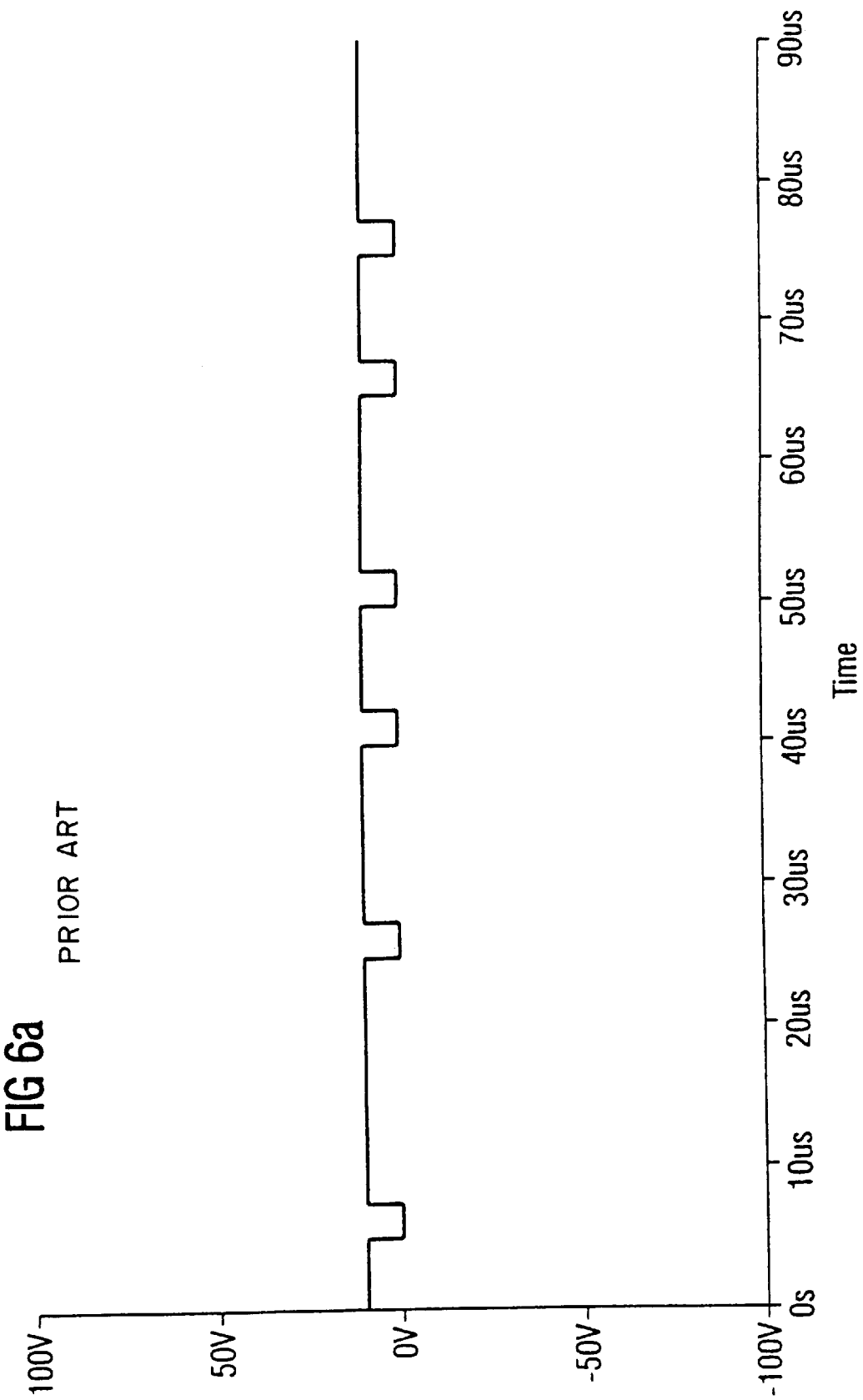
FIGS. 6A and 6B are graphs of the variation over time of a Miller-coded carrier signal with the bit sequence 101000110 and the associated frequency spectrum.
Figure 6B:
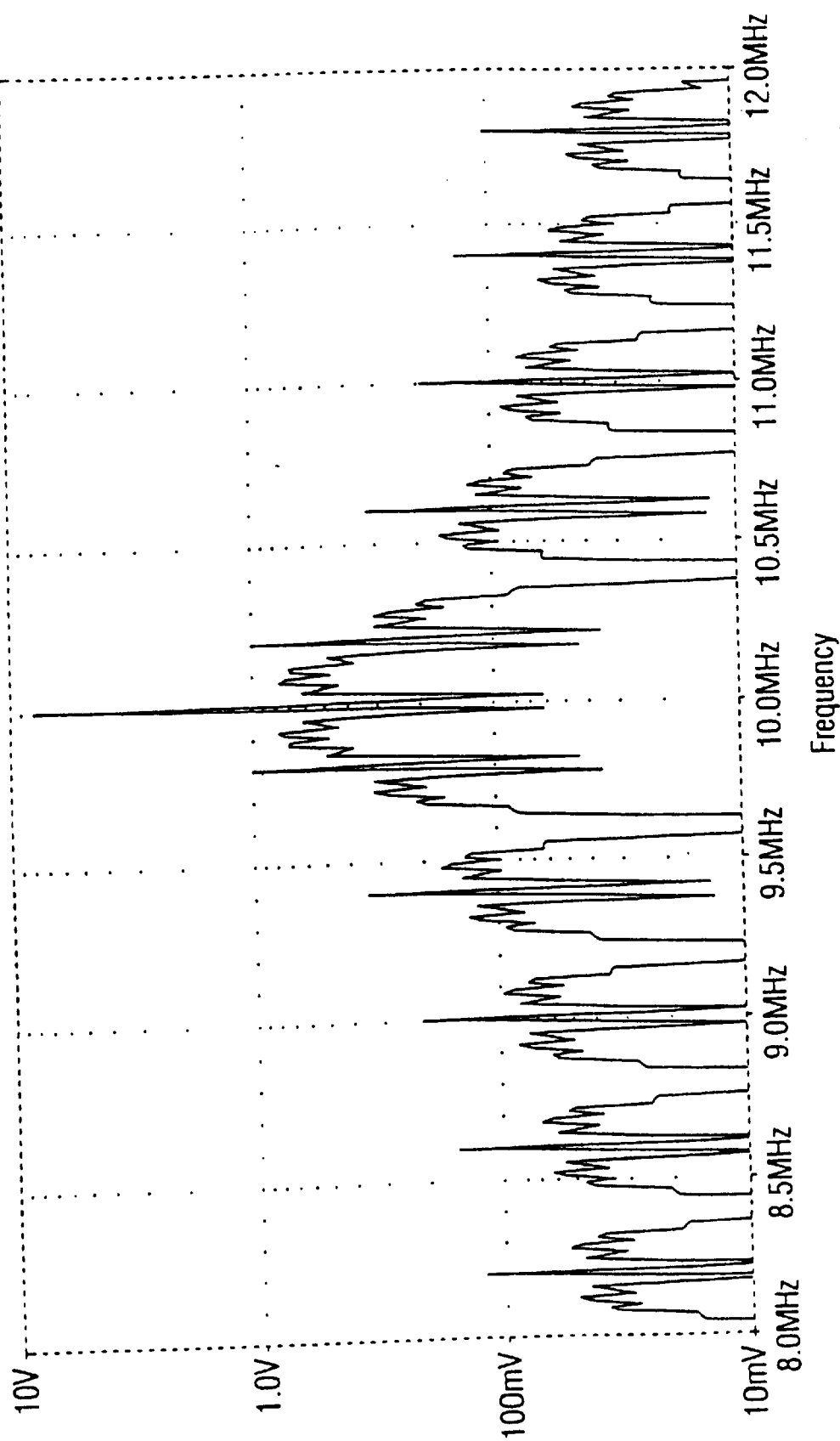
Figure 7A:
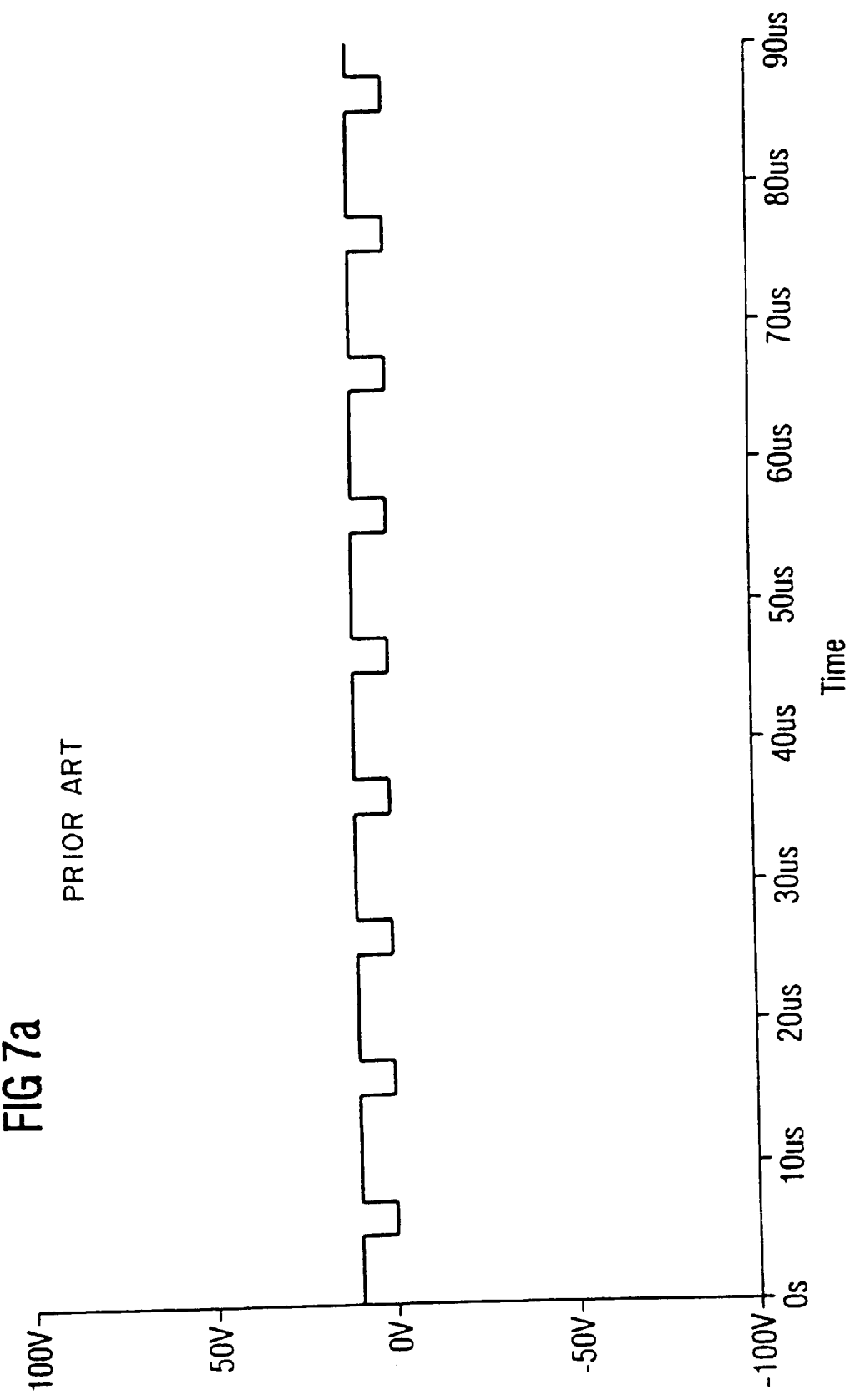
FIGS. 7A and 7B are graphs of the variation over time of the Miller-coded carrier signal with the bit sequence 111111111 and the associated frequency spectrum.
Figure 7B:
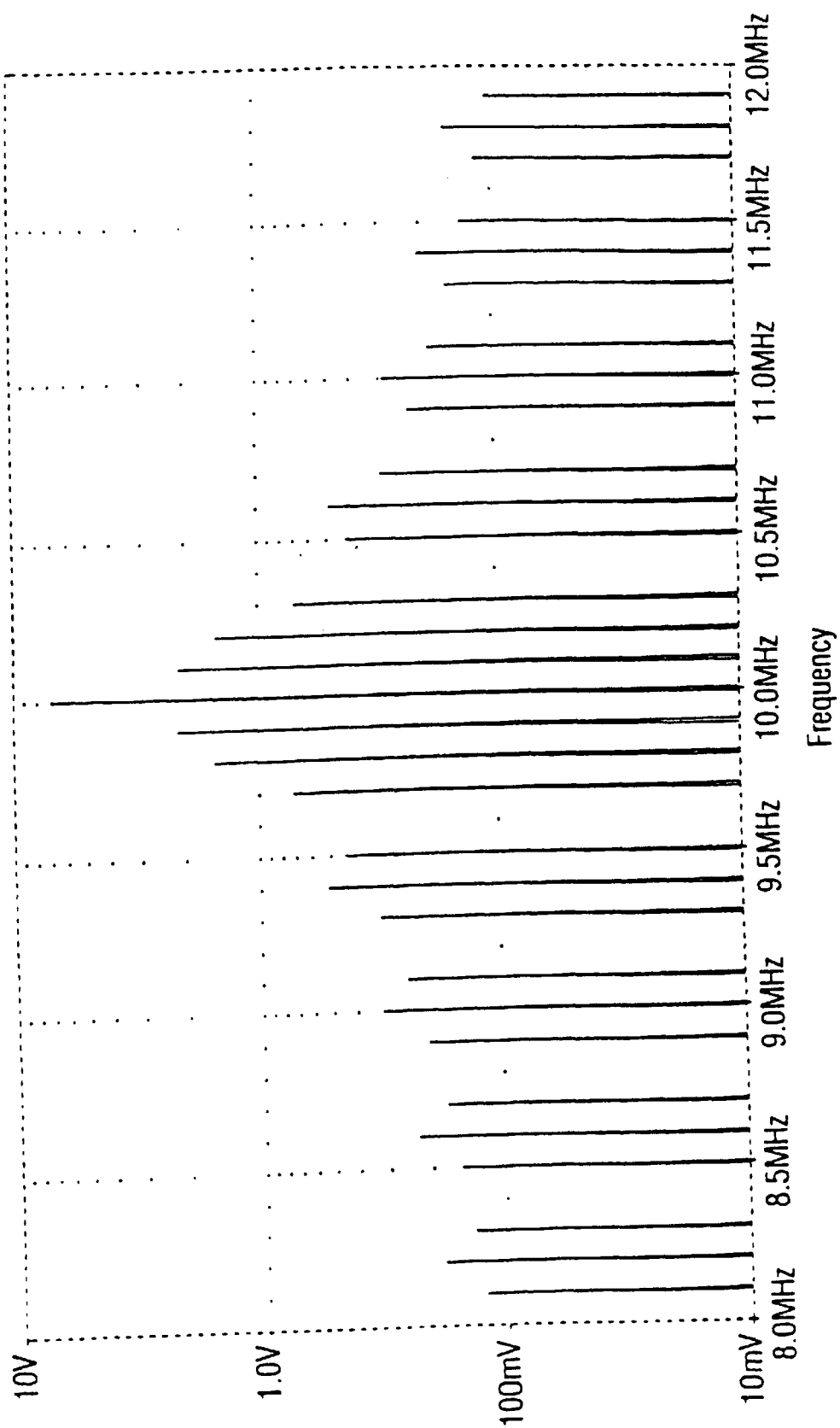

In all the figures of the drawing, sub-features and integral parts that correspond to one another bear the same reference symbol in each case. Referring now to the figures of the drawing in detail and first, particularly, to FIG. 1B thereof, there is shown a carrier signal which has been 100% ASK-modulated according to the invention and which transmits the bit sequence 100111000 in the time period represented. In this respect, in the example represented, only three shift keying points, i.e. time periods in which there is no carrier signal, are necessary, since three bits are transmitted per shift keying point. The value that these three bits have is determined by the position of the shift keying point in a time slot. FIG. 1A represents an example of this.

A time slot begins with a zero time period according to the invention, i.e. with a time period in which a shift keying point assigned to the data to be transmitted does not occur. The remaining part of a time slot is reserved for the possible positions of a shift keying point. For the selected example of three bits per shift keying point there are $2^3=8$ possible combinations of three bits, so that eight possible positions of one shift keying point have to be provided. In FIG. 1A, significances of bits are assigned to the possible positions in rising order. However, any desired assignment is possible. Thus, it may be advantageous to have, for example, assignments in which just one bit changes from one possible position of a shift keying point to the adjacent one because then a signal which is offset in terms of timing probably only causes one bit to change, which can easily be detected by a parity check. Such an assignment would be for example

/000/001/011/010/110/111/101/100/.

The positions of the shift keying points for the represented time slots for the bit sequence 100111000 which is to be transmitted are represented surrounded by boxes drawn with heavy lines.

As is clear from FIGS. 1A and 1B, given a succession of the last possible position in the time slot, for the bit sequence 111 in the example represented, and of the first possible position in the time slot, the bit sequence 000 in the example represented, two shift keying points would occur in succession if there was no zero time period according to the invention. In the transmission method on which the invention is based and in which the carrier signal is used directly as a clock signal, this would lead to an unacceptable long loss of the clock. For this reason, a zero time period is provided according to the invention.

However, in principle in the case in which the last and the first possible positions do not follow one another, it would be possible to provide, in the zero time period, a shift keying point assigned to control symbols. However, such control symbols can occur only between "suitable" data bit combinations if it has been ensured that the carrier signal is present for long enough between each shift keying point.

FIG. 2 represents advantageous refinements of a time slot. The upper diagram shows a time sequence of "electrical" bits represented by logic "0" states. However, other representations would also be possible. The intention with this transmission method is that the bit rate will not be increased so that when there are three bits to be transmitted per shift keying point a time slot has the duration of three "electrical" bits.

When there are three bits to be transmitted per shift keying point, it is necessary to provide eight possible positions and one zero time period in one time slot. In order to simplify the detection circuit in the receiver it is very advantageous if the duration of a zero time period is equal to the duration, or an integral multiple of the duration, of a possible position.

It is to be noted here that a shift keying point does not necessarily have to be of the same length as a possible position, but rather can easily be shorter. All that is necessary is that it must occur within the possible position, in order to permit the bit significances to be determined unambiguously.

The middle part of FIG. 2 represents the case in which a zero time period has the same duration as a possible position. On the other hand, the lower part of FIG. 2 represents the case in which a zero time period has four times the duration of a possible position, and thus corresponds to the duration of an "electrical" bit. These cases are particularly easy to detect.

In the examples represented, the zero time periods always occur at the start of a time slot. However, it is equally well possible to dispose or provide them at the end of a time slot.

A further solution according to the invention for avoiding an unacceptably long loss of the clock signal is represented in FIG. 3. Here, there is no zero time period provided, but, in order to avoid an unacceptably long loss of the clock signal during the succession of a last possible position and a first possible position of a shift keying point in the time slot, in this case instead of the shift keying point in the first possible position no shift keying point is transmitted in the time slot. To do this, it is necessary to buffer a respective position of a shift keying point during the subsequent time slot, in order to be able to determine whether the shift keying point was at the last possible position when there was a shift keying point missing in a time slot in the preceding time slot, or whether a transmission error has occurred. However, here it is possible to dispense with a circuit for determining the zero time period.

FIGS. 4A, 4B and 5A and 5B represent calculated frequency spectra for specific assumed bit sequences which are to be transmitted with the method according to the invention. A method would be selected with three bits per shift keying point and a duration of the zero time period of four possible positions, such as is illustrated in the lower part of FIG. 2.

A time slot thus lasts for 30 μs, and a possible position is 2.5 μs long, a shift keying point which is just as long being selected. In FIG. 4A, a bit sequence of 001000110 is selected, and in FIG. 5A a bit sequence of 000000000, which in terms of its frequency spectrum represents a worst case.

As is clear from the frequency spectra, with the, as it were, random bit sequence according to FIG. 4A, the distance between the side bands and the carrier is approximately 21.8 dB. Even in the worst case in FIG. 5B, there is still a distance of 20.9 dB, so that the condition of the radio approval mentioned above is fulfilled significantly better than in the prior art.

The specification for contemporary methods for transmitting data between a terminal and a portable data carrier over a wire-free electromagnetic transmission link prescribes a 100% ASK modulation, so that the methods according to the invention can be used particularly advantageously here. However, it is perfectly possible that in future the specifications will change and the modulation level permitted will be lower. In this case, the system would therefore not simply be switched on and off but rather switched between two levels. This would lead to a further reduction in the side bands. The protocol of the method according to the invention has the advantage of operating, without changes in the modulation level in accordance with the contemporary specification and also in the event of future changes to this specification.

I claim:

1. An improved method for transmitting data between a terminal and a portable data carrier via a wire-free electromagnetic transmission link, the improvement which comprises:

transmitting a carrier signal that is amplitude shift keying (ASK) modulated in accordance with the data and the carrier signal serving as a clock signal for the portable data carrier, a significance of the data determined by a position of a shift keying point in the carrier signal within a time slot, an information content of the shift keying point corresponding to a number of N bits, where N being greater than or equal to 2, and a significance of the N bits defined by the position of the shift keying point within $2^N$ possible positions within the time slot, wherein one of a start and an end of the time slot there is a zero time period in which no shift keying point occurs in the data to be transmitted.

2. The method according to claim 1, which comprises providing the time slot with a duration of N bits.

3. The method according to claim 1, which comprises providing the carrier signal as a 100% ASK modulated carrier signal.

4. An improved method for transmitting data between a terminal and a portable data carrier via a wire-free electromagnetic transmission link, the improvement which comprises:

transmitting a carrier signal that is 100% amplitude shift keying (ASK) modulated in accordance with the data and the carrier signal serving as a clock signal for the portable data carrier, a significance of the data determined by a position of a shift keying point in the carrier signal within a time slot, the shift keying point corresponding to a number of N bits, N being greater than or equal to 2, and a significance of the N bits defined by the position of the shift keying point within $2^N$ possible positions within the time slot, wherein if the data has the significance determined by a first possible position in the time slot and occurs after an occurrence of the data having the significance determined by a last possible position in a previous time slot, the significance of the data having the first possible position is determined by a fact that no shift keying point occurs at any position in the time slot.

* * * * *